(12) United States Patent
Yu

(10) Patent No.: US 12,120,502 B2
(45) Date of Patent: Oct. 15, 2024

(54) CONGESTION CONTROL METHOD AND APPARATUS, COMPUTER STORAGE MEDIUM AND TERMINAL

(71) Applicant: SANECHIPS TECHNOLOGY CO., LTD., Shenzhen (CN)

(72) Inventor: Dongyan Yu, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 430 days.

(21) Appl. No.: 17/622,768

(22) PCT Filed: Sep. 25, 2020

(86) PCT No.: PCT/CN2020/117644
§ 371 (c)(1),
(2) Date: Dec. 24, 2021

(87) PCT Pub. No.: WO2021/057888
PCT Pub. Date: Apr. 1, 2021

(65) Prior Publication Data
US 2022/0248263 A1    Aug. 4, 2022

(30) Foreign Application Priority Data

Sep. 25, 2019  (CN) .......................... 201910913576.X

(51) Int. Cl.
*H04W 28/02* (2009.01)
(52) U.S. Cl.
CPC .............................. *H04W 28/0289* (2013.01)
(58) Field of Classification Search
CPC ................................................ H04W 28/0289
See application file for complete search history.

(56) References Cited

U.S. PATENT DOCUMENTS

2008/0175263 A1* 7/2008 Chen ...................... H04L 47/821
                                                              370/431
2011/0096665 A1* 4/2011 McCann ................. H04L 47/27
                                                              370/235
(Continued)

FOREIGN PATENT DOCUMENTS

CN          102244568 A       11/2011
CN          102291836 A       12/2011
(Continued)

OTHER PUBLICATIONS

European Patent Office. Extended European Search Report for EP Application No. 20869959.5, mailed Jul. 19. 2022, pp. 1-10.
(Continued)

*Primary Examiner* — Brenda H Pham
(74) *Attorney, Agent, or Firm* — Vivacqua Crane, PLLC

(57) ABSTRACT

Disclosed are a congestion control method and apparatus, a non-transitory computer-readable storage medium and a terminal device. The congestion control method may include: for a plurality of terminal devices transmitting caller data in a first predetermined duration starting from a first moment, configuring a corresponding delayed access time for each terminal device at a first time interval; determining whether each terminal device satisfies a congestion control requirement; and based on a determination of whether the plurality of terminal devices satisfy the congestion control requirement, performing congestion control on the terminal device accessing a network; the terminal device comprises a low priority terminal device, and the delayed access time is configured to control a time that the terminal device accesses a network in response to a subsequent event being reported.

13 Claims, 2 Drawing Sheets

(56) References Cited

U.S. PATENT DOCUMENTS

2013/0201823 A1    8/2013   Gupta
2016/0261510 A1    9/2016   Burnette et al.
2017/0093727 A1    3/2017   Chen et al.

FOREIGN PATENT DOCUMENTS

| | | |
|---|---|---|
| CN | 102316600 A | 1/2012 |
| CN | 102833833 A | 12/2012 |
| CN | 104581422 A | 4/2015 |
| CN | 107969015 A | 11/2017 |
| CN | 107438031 A | 12/2017 |
| EP | 3404993 A1 | 11/2018 |
| GB | 2495271 A | 4/2013 |
| WO | 2011100540 A1 | 8/2011 |

OTHER PUBLICATIONS

The State Intellectual Property Office of People's Republic of China. First Office Action for CN Application No. 201910913576.X and English translation, mailed Feb. 29, 2024, pp. 1-10.
The State Intellectual Property Office of People's Republic of China. First Search Report for CN Application No. 201910913576.X and English translation, mailed Feb. 27, 2024, pp. 1-5.
International Searching Authority. International Search Report and Written Opinion for PCT Application No. PCT/CN2020/117644 and English translation, mailed Dec. 23, 2020 pp. 1-11.

\* cited by examiner

CONGESTION CONTROL METHOD AND APPARATUS, COMPUTER STORAGE MEDIUM AND TERMINAL

CROSS-REFERENCE TO RELATED APPLICATION

This application is a national stage filing under 35 U.S.C. § 371 of international application number PCT/CN2020/117644, filed Sep. 25, 2020, which claims priority to Chinese patent application No. 201910913576.x, filed Sep. 25, 2019. The contents of these applications are incorporated herein by reference in their entirety.

TECHNICAL FIELD

This application relates to, but is not limited to the technical field of wireless communication, and for example, relates to a congestion control method and apparatus, a non-transitory computer-readable storage medium and a terminal device.

BACKGROUND

With the development of mobile communication technologies, the forms of terminal devices are becoming more and more diversified. Terminal devices may be used not only for voice and data services, but also in the fields of industry, environment and humanities, or the like. Narrow Band Internet of Things (NB-IoT) terminal devices (IoT terminal devices) and systems based on Long Term Evolution (LTE) are widely used in device alarm, environmental monitoring and remote micro-control due to the advantages of low resource consumption, narrow bandwidth, small amount of data required for application and low cost thereof. Generally, IoT terminal devices for realizing different functions may work in one area at the same time. For example, IoT terminal devices are distributed along both sides of a highway to monitor the passing of vehicles on the highway. IoT terminal devices are distributed in a plurality of places of a lake to monitor water pollution of the lake. Due to the reusability and difficult erection of IoT terminal devices, a large number of IoT terminal devices are usually provided in a coverage area of one network element. Therefore, it is necessary for a communication system to perform congestion control on the IoT terminal devices.

The congestion control in the related technology includes: three aspects including congestion control of access network elements (Evolved Node B, eNodeB), congestion control of mobility management and congestion control of service access points. Congestion control is managed in a hierarchical manner, including the following processing:

Preconditions: for the Low Priority terminal devices (including NB-IoT terminal devices and terminal devices that are not NB-IoT terminal devices but inserted with cards having low priority attributes), when the terminal device interacts an access network element in air interface standard signaling, a Establish Cause in a Radio Resource Control CONNECTION REQUEST is indicated as "Delay Tolerant", and the access network element identifies the low priority terminal device based on the Establish Cause. When the terminal device interacts with a core network element (Mobility Management Entity, MME) in the air interface standard signaling, the low priority terminal device is indicated by a Device Type. When the low priority terminal device performs event monitoring, uplink data is transmitted through the following steps.

At step 1: when the terminal device launches to a connection mode from an idle mode, the Establish Cause in the radio resource control is modified as "Delay Tolerant". An eNodeB determines the load situations thereof, and performs step 2 if the current load is less. When the load is heavier, the eNodeB informs the terminal device to keep the idle mode through RRC CONNECTION REJECT, and carries an Extended Wait Timer in RRC CONNECTION REJECT while notifying the terminal device. The terminal device starts the Extended Wait Timer, sends the uplink data again and restarts step 1 when the Extended Wait Timer expires and tries to access again. At step 2: the eNodeB provides radio resource to the terminal device to enter a connection status, and transfers the signaling interacted between the terminal device and the core network to the core network element through initial terminal device information. At step 3: the core network element confirms whether an accessed terminal device is a low priority terminal device based on the Device Type and judges a load status of the current network. If the current load is normal, step 4 is performed. If the current load will cause network congestion, the terminal device is rejected to be accessed. Thereafter, the terminal device starts a mobility management congestion timer (T3346), and re-enters step 1 to transmit the uplink data after T3346 expires. At step 4: the core network element interacts with a public data network gateway (Packet Data Network GateWay, PGW) through General Packet Radio Service Tunneling Protocol for Control Plane (GTPC) standard signaling, to create a session for the terminal device, and allocate tunnel information, and the like. In this case, PGW detects whether an access point of the current terminal device is congested. If the access point of the current terminal device is not congested, step 5 is continuously performed. If the access point of the current terminal device is congested, PGW rejects the terminal device at the current access point and indicates insufficient resources. The terminal device starts an access network congestion control timer (T3396). After the timer expires, step 1 may be re-performed to try to transmit the uplink data. At step 5: all connections between the terminal device and the core network gateway are available, and the uplink data of the terminal device may be forwarded to external network servers and other devices through the gateway.

So far, through the above steps, the network allocates radio resources and transmission channels for transmitting the uplink data to the terminal device, thus realizing the congestion control of the network.

The foregoing scheme is based on a hierarchy unit to perform congestion control layer by layer. When the load on one layer is heavy, the way to avoid congestion is to delay the access and data transmission of the terminal device. After the terminal device is denied to access, the terminal device will not transmit the same type of uplink data again before a corresponding timer expires. This congestion control method will lead to the deviation of real-time data, because the congestion control usually leads to a large number of data convergence of the same service type. For example, a plurality of IoT terminal devices (UE_Type1) for monitoring water quality and IoT terminal devices (UE_Type2) for monitoring vehicle passing present in one eNodeB scope. At T1, a vehicle passes through a highway, and all or most of UE_Type2 accesses the network in a large amount in a period of time after T1, and report the vehicle passing event, which makes the network load enter a congestion saturation status in this period of time. In this period, if the water quality changes, UE_Type1 also needs to access the network because the UE_Type1 needs to report the water quality. Due to network congestion, most of UE_Type1 will be rejected during the access process, and are required to delay the access for a period of T2. Within T1+T2, a large number of UE_Type1 re-access the network. According to the above congestion control method, for a period of time range at T1, two events including vehicle passing and water quality change occur. However, for a water quality monitoring server located in an external network, the server can perceive the events only after T1+T2. However, in the time range of T1, a vehicle monitoring server receives a large number of uplink data indicating vehicles passing through, and the data contents are basically the same. In order to distinguish the service types of the terminal device and realize the distinction and control of different service data, it is necessary to obtain positioning information of the terminal device, which will lead to an increase in terminal device cost and network complexity. In conclusion, it is necessary to realize balanced reporting of different business data during congestion control.

SUMMARY

The following is an overview of the subject described in this application. This summary is not intended to limit the protection scope of the claims.

The embodiments of the present application provide a congestion control method and apparatus, a non-transitory computer-readable storage medium and a terminal device, which can realize balanced reporting of different service data while realizing congestion control.

An embodiment of the present application provides a congestion control method, the congestion control method which may include:
for a plurality of terminal devices transmitting caller data in a first predetermined duration starting from a first moment, configuring a corresponding delayed access time for each terminal device at a first time interval;
for each terminal device configured with the corresponding delayed access time, determining whether the terminal device satisfies a congestion control requirement; and
based on a determination whether the plurality of terminal devices satisfy the congestion control requirement, performing congestion control on the terminal device accessing a network;
the terminal device may include a low priority terminal device, and the delayed access time is configured to control a time that the terminal device accesses a network in response to a subsequent event being reported.

An embodiment of the present application further provides a congestion control apparatus, which may include: an initial configuration unit, a determination unit, and an adjustment and control unit;
the initial configuration unit is configured for: for a plurality of terminal devices transmitting caller data in a first predetermined duration starting from a first moment, configuring a corresponding delayed access time for each terminal device at a first time interval;
the determination unit is configured for: for each terminal device configured with the corresponding delayed access time, determining whether the terminal device satisfies a congestion control requirement; and
the adjustment and control unit is configured for: based on a determination whether the plurality of terminal devices satisfy the congestion control requirement, performing congestion control on the terminal device accessing a network;
the terminal device may include a low priority terminal device, and the delayed access time is configured to control a time that the terminal device accesses a network in response to a subsequent event being reported.

An embodiment of the present application further provides a non-transitory computer-readable storage medium, wherein the non-transitory computer-readable storage medium storages instructions which, when executed by a processor, causes the processor to perform the above congestion control method.

An embodiment of the present application further provides a terminal device, which may include: a memory, a processor and a program instruction stored in the memory and executable by the processor, wherein the program instruction, when executed by the processor, causes the processor to perform the above congestion control method.

BRIEF DESCRIPTION OF DRAWINGS

The accompanying drawings serve to provide a further understanding of the technical schemes of the present application and constitute a part of the specification, and are used together with the embodiments of the present application to explain the technical schemes of the present application, and do not constitute limitations to the technical schemes of the present application.

DETAILED DESCRIPTION

The embodiments of the present invention are described below with reference to the accompanying drawings.

The steps shown in the flowchart of the accompanying drawings may be executed in a computer system configured to execute a set of computer executable instructions. Also, although a logical sequence is shown in the flowchart, in some cases, the steps shown or described may be executed in a different sequence.

Figure 1:
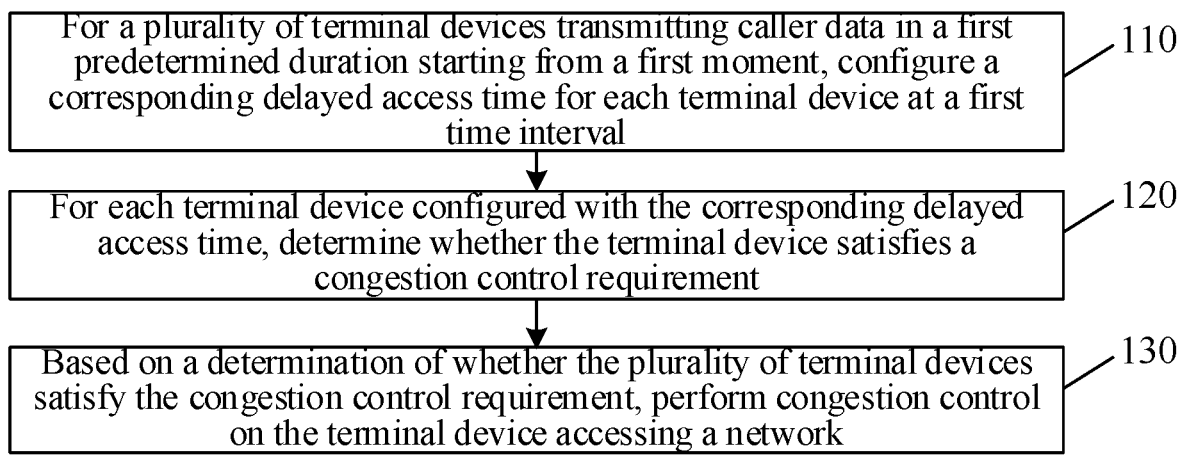
FIG. 1 is a flowchart of a congestion control method provided by an embodiment of the present application.

FIG. 1 is a flowchart of a congestion control method provided by an embodiment of the present application. As shown in FIG. 1, the method includes the following steps of S110, S120 and S130. At S110, for a plurality of terminal devices transmitting caller data in a first predetermined duration starting from a first moment, a corresponding delayed access time is configured for each terminal device at a first time interval.

Whether a terminal device sends caller data or not may be analyzed and determined based on relevant principles.

At S120, for each terminal device configured with the corresponding delayed access time, it is determined whether the terminal device satisfies a congestion control requirement.

In an embodiment, before determining whether the terminal device satisfies a congestion control requirement, a method according to the embodiment of the present application further includes: monitoring a terminal device accessing the network within a second predetermined duration from a second moment; wherein, the second moment includes: a moment when a first terminal device accessing the network based on the allocated delayed access time is monitored after corresponding the delayed access time for each terminal device; the second predetermined duration being greater than the first predetermined duration.

In the embodiment of the present application, the second predetermined duration is determined to monitor whether the terminal device access network configured with the delayed access time in the first predetermined duration satisfies the congestion control requirement. Therefore, the second predetermined duration is slightly greater than the first predetermined duration. When a terminal device that does not satisfy the congestion control requirement is determined, in the embodiment of the present application, a technical personnel may reset a first predetermined duration and a second predetermined duration for configuring a delayed access time for next round.

In an embodiment, determining whether the terminal device satisfies a congestion control requirement includes: for each terminal device monitored, determining whether each terminal device accesses the network at the delayed access time configured; in response to a determination that each terminal device accesses the network at the delayed access time configured, determining that the delayed access time configured for each terminal device satisfies the congestion control requirement; and in response to a determination that each terminal device does not access the network at the delayed access time configured, determining that the delayed access time configured for each terminal device does not satisfy the congestion control requirement.

At S130, based on a determination whether the plurality of terminal devices satisfy the congestion control requirement, congestion control is performed on the terminal device accessing a network; wherein, the terminal device includes a low priority terminal device, and the delayed access time is configured to control a time that the terminal device accesses a network when a subsequent event is reported.

In an embodiment, based on a determination whether the plurality of terminal devices satisfy the congestion control requirement, performing congestion control on the terminal device accessing a network includes: in response to a determination that one or more of the plurality of terminal devices do not satisfy the congestion control requirement, reconfiguring a corresponding delayed access time for the one or more terminal devices that do not satisfy the congestion control requirement based on a strategy until all terminal devices satisfy the congestion control requirement; and in response to a determination that all the terminal device satisfies the congestion control requirement, controlling the terminal device to access the network based on the configured delayed access time; wherein, a time interval for reconfiguring a corresponding delayed access time for the one or more terminal devices is not equal to the first time interval.

In an embodiment, reconfiguring a corresponding delayed access time for the one or more terminal devices based on a strategy includes: for a terminal device that does not satisfy the congestion control requirement, configuring a corresponding delayed access time for the terminal device based on a second time interval; after configuring the corresponding delayed access time for the terminal device based on the second time interval, for each terminal device configured with the corresponding delayed access time, determining whether the terminal device satisfies the congestion control requirement; and in response to a determination that one or more terminal devices do not satisfy the congestion control requirement, reconfiguring a corresponding delayed access time for the terminal device that does not satisfy the congestion control requirement based on a third time interval until all terminal devices satisfy the congestion control requirement; wherein, a duration of the second time interval and a duration of the first time interval are not equal, and the third time interval is different from the previously configured time intervals for the delayed access time.

In an embodiment, a time interval for the delayed access time is configured for terminal devices, which is used to adjust ordering of the terminal devices that do not satisfy the congestion control requirement in a queue of an access network, so that the terminal devices originally ordered in a congestion period can be inserted into a queue that satisfies the congestion control requirement after reconfiguring a new delayed access time.

The first time interval, the second time interval and the third time interval in the embodiment of the present application are determined by those having ordinary skill in the art with reference to parameters such as the number of terminal devices accessing the network and the first predetermined duration. In addition, the third time interval in the embodiment of the present application is relatively speaking. When configuring the delayed access time for the terminal device that does not satisfy the congestion control requirement based on the second time interval, the terminal device that does not satisfy the congestion control requirement is configured with the delayed access time based on the third time interval when it is judged that the terminal device does not satisfy the congestion control requirement based on a time when the terminal device accesses the network. After completing the configuration of the delayed access time for the terminal device in this part, it is re-determined whether the delayed access time configured for the terminal device satisfies the congestion control requirement for each terminal device. If there are still terminal devices that do not satisfy the congestion control requirement, the third time interval which is different from the time interval of the previously configured delayed access time is continuously determined, and corresponding delayed access times are configured for a plurality of terminal devices respectively based on the re-determined third time interval, so as to continuously verify until all the configured delayed access time can enable the terminal devices accessing the network to satisfy the congestion control requirements.

In the embodiment of the present application, congestion control is performed when it is determined that there are terminal devices that do not satisfy the congestion control requirement. By configuring delayed access time of different time intervals for the terminal devices that do not satisfy the congestion control requirement during each uplink data transmission, the terminal devices that cannot access the network originally can access the network after adjusting the delayed access time. For the convenience of explaining this part, a simple example is given below: it is assumed that within the first predetermined duration starting from the first moment, after configuring the delayed access time for the terminal devices based on the first time interval of 1 second, it is found that the top ten terminal devices transmit uplink data normally, and the five terminal devices ranked behind fail to access the network based on the configured delayed access time. In the embodiment of the present application, after determining the second time interval different from the first time interval, a delayed access time can be reconfigured for the five terminal devices ranked behind, for example, the second time interval is determined to be 2 seconds. After the delayed access time is configured through different time intervals, the terminal devices that do not satisfy the congestion control requirement will make network connection under different access orders based the reconfigured delayed access time, that is, the five terminal devices originally ranked behind will be inserted into the queue of the terminal devices that satisfy the congestion control requirement, so as to avoid that the previously congested terminal device cannot transmit uplink data again due to congestion.

In an embodiment, it is provided that the delayed access time configured based on the currently determined time interval is T_delay[Idx], and the delayed access time configured at a later time is T_delay[Idx+1], then T_delay[Idx+1] and T_delay[Idx] may have the following linear relationship: T_delay [Idx+1]=T_delay [Idx]+Delta0/UeNum. Delta0 represents a predetermined duration of configuring delayed access time for the terminal devices that do not satisfy the congestion control requirement; and UeNum represents a number of terminal devices accessing the network in Delta0.

In an embodiment, after configuring a corresponding delayed access time for a plurality of terminal devices, the method further includes: recording the delayed access time allocated to each terminal device by taking a predetermined unique terminal device identifier as an index. By recording the delayed access time with the predetermined unique terminal device identifier as the index, the delayed access time allocated to different terminal devices may be identified.

Respectively configuring a corresponding delayed access time for a plurality of terminal devices includes: the delayed access time configured for the plurality of terminal devices based on the first time interval, the second time interval and the third time interval.

According to the embodiment of the present application, a plurality of groups of delayed access time are configured for the terminal devices based on different time intervals, and the terminal devices configured with the delayed access time based on the same time interval have the same slope in the time of accessing the network and keep linear distribution arrangement. In an embodiment, when the terminal devices are configured with the delayed access time based on the first time interval, the group of terminal devices configured with the delayed access time at the first time interval have the same first slope in the time of accessing the network and keep linear distribution arrangement. When the terminal devices are configured with the delayed access time based on the second time interval, the group of terminal devices configured with the delayed access time at the second time interval have the same second slope in the time of accessing the network and keep linear distribution arrangement. When the terminal devices are configured with the delayed access time based on the third time interval, the group of terminal devices configured with the delayed access time at the third time interval have the same third slope in the time of accessing the network and keep linear distribution arrangement, and so on.

In an embodiment, for determining whether the terminal device satisfies the congestion control requirement, the method according to the embodiment of the present application further includes: counting a number of times that each terminal device does not satisfy the congestion control requirement; and in response to a determination that the number of times that the terminal device does not satisfy the congestion control requirement is greater than a predetermined number threshold, feeding back an abnormal status of the terminal device.

Compared with the related technology, the technical scheme of the present application includes: for the plurality of terminal devices transmitting caller data in the first predetermined duration starting from the first moment, configuring the corresponding delayed access time for each terminal device at the first time interval; for each terminal device configured with the corresponding delayed access time, determining whether the terminal device satisfies the congestion control requirement; and based on a determination whether the plurality of terminal devices satisfy the congestion control requirement, performing congestion control on the terminal device accessing the network; wherein, the terminal device includes the low priority terminal device, and the delayed access time is configured to control the time that the terminal device accesses the network when the subsequent event is reported. In the embodiment of the present application, the congestion control is performed based on whether the delay access time configured for the terminal device satisfies the congestion control requirement, which provides technical support for realizing balanced reporting of service data. For the terminal devices that do not satisfy the congestion control requirement, the delayed access time is reconfigured for the terminal devices. The time interval of the reconfigured delayed access time is different from the time interval of the previously configured delayed access time. Through the different time intervals, the terminal devices with previous access congestion are inserted into the queue without access congestion, thus realizing the balanced reporting of different service data.

Figure 2:
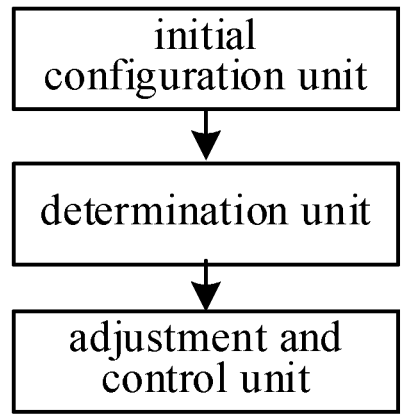
FIG. 2 is a structural block diagram of a congestion control apparatus provided by an embodiment of the present application.

FIG. 2 is a structural block diagram of a congestion control apparatus provided by an embodiment of the present application, as shown in FIG. 2, including: an initial configuration unit, a determination unit, and an adjustment and control unit; wherein, the initial configuration unit is configured for: for a plurality of terminal devices transmitting caller data in a first predetermined duration starting from a first moment, configuring a corresponding delayed access time for each terminal device at a first time interval; the determination unit is configured for: for each terminal device configured with the corresponding delayed access time, determining whether the terminal device satisfies a congestion control requirement; and the adjustment and control unit is configured for: based on a determination whether the plurality of terminal devices satisfy the congestion control requirement, performing congestion control on the terminal device accessing a network; wherein, the terminal device includes a low priority terminal device, and the delayed access time is configured to control a time that the terminal device accesses a network when a subsequent event is reported.

In an embodiment, the adjustment and control unit includes an adjustment module and a control module; wherein, the adjustment module is configured for: in response to a determination that one or more of the plurality of terminal devices do not satisfy the congestion control requirement, reconfiguring a corresponding delayed access time for the one or more terminal devices that do not satisfy the congestion control requirement based on a strategy until all terminal devices satisfy the congestion control requirement; and the control module is configured for: in response to a determination that all the terminal device satisfies the congestion control requirement, controlling the terminal device to access the network based on the configured delayed access time; wherein, a time interval for reconfiguring a corresponding delayed access time for the one or more terminal devices is not equal to the first time interval.

In an embodiment, the adjustment module is configured for reconfiguring a corresponding delayed access time for the one or more terminal devices based on a strategy, including: for a terminal device that does not satisfy the congestion control requirement, configuring a corresponding delayed access time for the terminal device based on a second time interval; after configuring the corresponding delayed access time for the terminal device based on the second time interval, for the terminal device configured with the corresponding delayed access time, determining whether the terminal device satisfies the congestion control requirement; and in response to a determination that one or more terminal devices do not satisfy the congestion control requirement, reconfiguring a corresponding delayed access time for the terminal device that does not satisfy the congestion control requirement based on a third time interval until all terminal devices satisfy the congestion control requirement; wherein, a duration of the second time interval and a duration of the first time interval are not equal, and the third time interval is different from the previously configured time intervals for the delayed access time.

The third time interval in the embodiment of the present application is relatively speaking. When configuring the delayed access time for the terminal device that does not satisfy the congestion control requirement based on the second time interval, the terminal device that does not satisfy the congestion control requirement is configured with the delayed access time based on the third time interval when it is judged that the terminal device does not satisfy the congestion control requirement based on a time when the terminal device accesses the network. After completing the configuration of the delayed access time for the terminal device in this part, it is re-determined whether the delayed access time configured for the terminal device satisfies the congestion control requirement for each terminal device. If there are still terminal devices that do not satisfy the congestion control requirement, the third time interval which is different from the time interval of the previously configured delayed access time is continuously determined, and corresponding delayed access times are configured for a plurality of terminal devices respectively based on the re-determined third time interval, so as to continuously verify until all the configured delayed access time can enable the terminal devices accessing the network to satisfy the congestion control requirements.

In an embodiment, the apparatus in the embodiment of the present application further includes a monitoring unit, which is configured for: monitoring a terminal device accessing the network within a second predetermined duration from a second moment; wherein, the second moment includes: a moment when a first terminal device accessing the network based on the configured delayed access time is monitored after corresponding the delayed access time for each terminal device; the second predetermined duration being greater than the first predetermined duration.

In the embodiment of the present application, the second predetermined duration is determined to monitor whether the terminal device access network configured with the delayed access time in the first predetermined duration satisfies the congestion control requirement. Therefore, the second predetermined duration is slightly greater than the first predetermined duration. When a terminal device that does not satisfy the congestion control requirement is determined, in the embodiment of the present application, a technical personnel may reset a first predetermined duration and a second predetermined duration for configuring a delayed access time for next round.

In an embodiment, the determination unit is configured for: for each terminal device monitored, determining whether each terminal device accesses the network at the delayed access time configured; in response to a determination that each terminal device accesses the network at the delayed access time configured, determining that the delayed access time configured for each terminal device satisfies the congestion control requirement; and in response to a determination that each terminal device does not access the network at the delayed access time configured, determining that the delayed access time configured for each terminal device does not satisfy the congestion control requirement.

In an embodiment, the apparatus in the embodiment of the present application further includes a recording unit, which is configured for: recording the delayed access time allocated to each terminal device by taking a predetermined unique terminal device identifier as an index. By recording the delayed access time with the predetermined unique terminal device identifier as the index, the delayed access time allocated to different terminal devices may be identified.

Respectively configuring a corresponding delayed access time for a plurality of terminal devices includes: the delayed access time configured for the plurality of terminal devices based on the first time interval, the second time interval and the third time interval.

According to the embodiment of the present application, a plurality of groups of delayed access time are configured for the terminal devices based on different time intervals, and the terminal devices configured with the delayed access time based on the same time interval have the same slope in the time of accessing the network and keep linear distribution arrangement. In an embodiment, when the terminal devices are configured with the delayed access time based on the first time interval, the group of terminal devices configured with the delayed access time at the first time interval have the same first slope in the time of accessing the network and keep linear distribution arrangement. When the terminal devices are configured with the delayed access time based on the second time interval, the group of terminal devices configured with the delayed access time at the second time interval have the same second slope in the time of accessing the network and keep linear distribution arrangement. When the terminal devices are configured with the delayed access time based on the third time interval, the group of terminal devices configured with the delayed access time at the third time interval have the same third slope in the time of accessing the network and keep linear distribution arrangement, and so on.

In an embodiment, the apparatus in the embodiment of the present application further includes an abnormality feedback unit, which is configured for: counting a number of times that each terminal device does not satisfy the congestion control requirement; and in response to a determination that the number of times that the terminal device does not satisfy the congestion control requirement is greater than a predetermined number threshold, feeding back an abnormal status of the terminal device.

An embodiment of the present application further provides a non-transitory computer-readable storage medium, wherein the non-transitory computer-readable storage medium storages a computer-executable instruction for performing the above congestion control method.

An embodiment of the present application further provides a terminal device, including: a memory and a processor; wherein, the processor is configured to execute a program instruction in the memory; and the program instruction is read in the processor to execute the above congestion control method.

The method of the embodiment of the present invention is explained by the following application example, which is only used to illustrate the present application, and is not used to limit the protection scope of the present application.

Application Example

When a plurality of terminal devices are monitored to transmit caller data in a first predetermined duration starting from a first moment, a corresponding delayed access time is configured for each terminal device at a first time interval. The terminal device in the application example includes a low priority terminal device, and the delayed access time is configured to control a time that the terminal device accesses a network when a subsequent event is reported. In this application example, when configuring the delayed access time for the terminal device, the terminal device may be allocated a unique terminal device identifier based on a strategy, and the delayed access time allocated to each terminal device may be recorded with the unique terminal device identifier allocated to the terminal device as an index.

In an embodiment, when a plurality of terminal devices are monitored to transmit caller data in a first predetermined duration (Delta0) starting from a first moment (T0), a corresponding unique terminal device identifier and a delayed access time reported in a subsequent event are allocated to each accessed terminal device. The unique terminal device identifier may be represented by UeID[T0, Idx], or by a unique identifier determined by other coding strategies. The access time may be expressed by T_delay. In order to facilitate the allocation of the delayed access time for the terminal devices and transmit the allocated delayed access time to other components in the system, the delayed access time allocated to the plurality of terminal devices are recorded with the unique terminal device identifiers allocated to the terminal devices as an index, and the delayed access time allocated to the terminal devices may be recorded through T_delay[UeID]. Referring to relevant theories, in this application example, the T_delay[UeID] may be transmitted to the access network through a system message, for example, the T_delay[UeID] is transmitted to the access network through a Radio Control Connection Setup Request message.

Starting from a first terminal device accessing the network based on the allocated delayed access time, terminal devices accessing the network within a second predetermined duration are monitored; wherein, the second predetermined duration is greater than the first predetermined duration.

In an embodiment, the second predetermined duration (Delta1) may be longer than the first predetermined duration by a predetermined number of minimum time granularity. By monitoring the second predetermined duration, it can be determined whether all terminal devices allocated with the first delayed access time access the network within a given delayed access time. The predetermined value may be determined empirically by those having ordinary skill in the art, for example, the time granularity of Delta® is second, and Delta1 may be equal to Delta0+1 seconds. The time granularity of Delta® is second, and Delta1 may be equal to Delta0+1 minutes.

For the monitored terminal devices accessing the network within the second predetermined duration, it is determined whether the delayed access time configured for the terminal devices satisfy the congestion control requirement. In an embodiment, determining whether the delayed access time configured for the terminal devices satisfy the congestion control requirement includes: for the monitored terminal devices accessing the network, determining whether the terminal devices access the network at the configured delayed access time; when the terminal devices access the network at the configured delayed access time, determining that the delayed access time configured for the terminal devices satisfy the congestion control requirement; and when the terminal devices do not access the network at the configured delayed access time, determining that the delayed access time configured for the terminal devices does not satisfy the congestion control requirement.

For the terminal devices which are determined to be allocated with the delayed access time that does not satisfy the congestion control requirement, the corresponding delayed access time reported in a subsequent event is reconfigured for the terminal devices based on the second time interval. The first time interval is not equal to the second time interval. For example, when the first time interval is 1 second, then the second time interval is not equal to 1 second, for example, the second time interval may be equal to 2 seconds or 3 seconds, and the like, which may be analyzed and determined by those having ordinary skill in the art based on the number of terminal devices accessing the network, a service cycle, and the like. In the embodiment of the present application, the terminal device unique identifier previously allocated to the terminal device may be used to record the delayed access time allocated to the terminal device based on the second time interval, or a terminal device unique identifier UeID[Ti, Idx] may be reconfigured for the terminal device at the moment when the first terminal device accessing the network based on the allocated delayed access time is monitored.

In an embodiment, the delayed access time is allocated for the plurality of terminal devices based on the first time interval, and the terminal devices have the same first slope in the access time and keep linear distribution arrangement. In an embodiment, the delayed access time is allocated for the plurality of terminal devices based on the second time interval, and the terminal devices have the same second slope in the access time and keep linear distribution arrangement.

After configuring the corresponding delayed access time for the plurality of terminal devices based on the second time interval, for each terminal device configured with the delayed access time, it is determined whether the terminal device satisfies the congestion control requirement; and in response to a determination that one or more of the plurality of terminal devices do not satisfy the congestion control requirement, a corresponding delayed access time is reconfigured for the one or more terminal devices that do not satisfy the congestion control requirement based on a third time interval until all terminal devices satisfy the congestion control requirement; wherein, the third time interval is different from the time interval of the previously configured delayed access time.

In the process of congestion control in the embodiment of the present application, after determining the terminal devices that do not satisfy the congestion control requirement, the delayed access time with different time intervals is allocated to such terminal devices, thereby realizing congestion control and promoting the balanced reporting of data of various services.

In an embodiment, the method according to the embodiment of the present application further includes: for each terminal device, counting a number of times that the delayed access time allocated to the terminal device does not satisfy the congestion control requirement, and in response to a determination that the number of times that the delayed access time allocated to the terminal device does not satisfy the congestion control requirement is greater than a predetermined number threshold, feeding back an abnormal state of the terminal device. In the embodiment of the present application, the abnormal status of the terminal device may be fed back to a plurality of units of the embodiment of the present application and an early warning unit of a communication system. The abnormal status of the terminal device is eliminated with reference to the related technology. When the abnormal status of the terminal device is eliminated, a delayed access time may be re-allocated to the terminal device in the embodiment of the present application.

Figure 3:
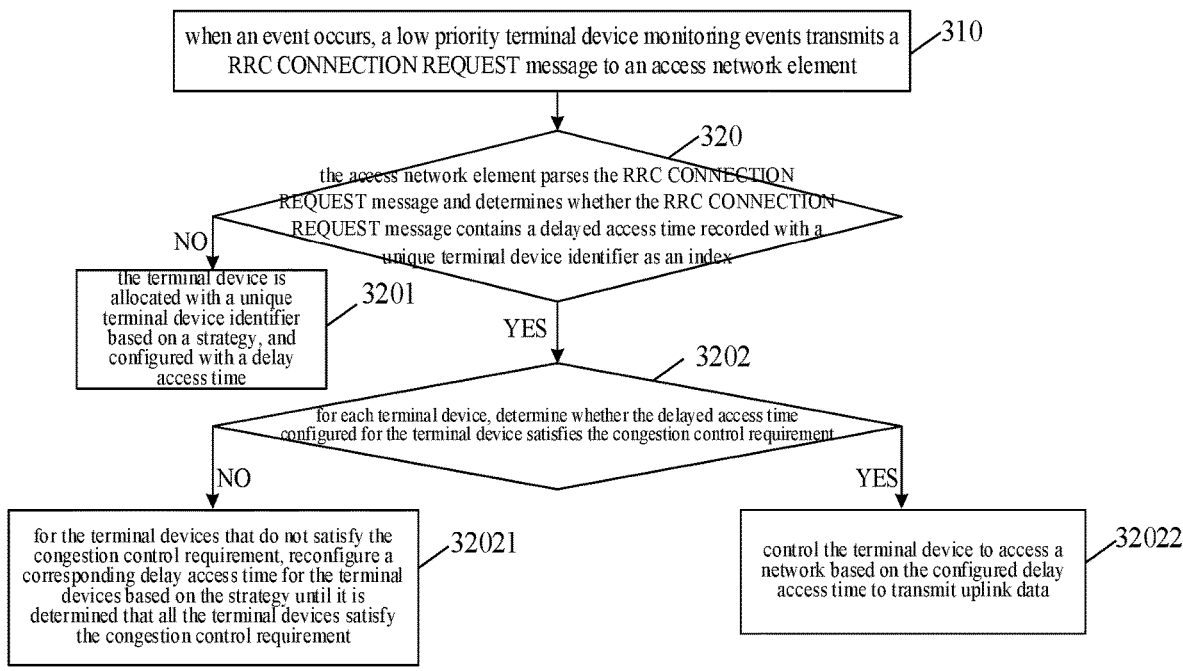
FIG. 3 is a flowchart of a congestion control method provided by an application example of the present application.

The Nb-IoT network in this application example is taken as an example to illustrate the above examples, and the embodiment of the present application may also be applied to other systems of networks, such as LTE network, Universal Terrestrial Radio Access Network (UTRAN), and the like. In this application example, an access network element (eNodeB) is employed to configure the delayed access time for the Nb-IoT network. After the access network element transmits the configured delayed access time to the low priority terminal device through relevant signaling or message, the low priority terminal device transmits uplink data based on the configured delayed access time. The access network element reconfigures, based on a determination that whether the delayed access time configured for the terminal device satisfies the congestion control requirement, the delayed access time until the configured delayed access time satisfies the congestion control requirement. FIG. 3 is a flowchart of a congestion control method provided by an application example of the present application, as shown in FIG. 3, including the follows steps of S310, S320, S3201, S3202, S32021 and S32022.

At S310, when an event occurs, a low priority terminal device monitoring events transmits a Radio Resource Control (RRC) CONNECTION REQUEST message to an access network element to request to obtain radio resources and bearers.

At S320, the access network element parses the RRC CONNECTION REQUEST message and determines whether the RRC CONNECTION REQUEST message contains a delayed access time recorded with a unique terminal device identifier as an index. When the RRC CONNECTION REQUEST message does not contain the delayed access time recorded with the unique terminal device identifier as the index, S3201 is executed. When it is determined that the RRC CONNECTION REQUEST message contains the delayed access time recorded with the unique terminal device identifier as the index, S3202 is executed.

At S3201, the terminal device is allocated with a unique terminal device identifier based on a strategy, and configured with a delay access time.

When configuring the delayed access time for the terminal device, the access network element may first determine a time interval of the delayed access time previously configured for terminal devices of other access networks, determine the time interval for configuring delayed access time for the current terminal device based on the determined time interval of the delayed access time configured for a plurality of terminal devices, and configure the delayed access time for the current terminal device based on the determined time interval.

At S3202, for each terminal device, it is determined whether the delayed access time configured for the terminal device satisfies the congestion control requirement. When it is determined that one or more terminal devices do not satisfy the congestion control requirement, S32021 is executed. When it is determined that all the terminal devices satisfy the congestion control requirement, S32022 is executed.

At S32021, for the terminal devices that do not satisfy the congestion control requirement, a corresponding delay access time is reconfigured for the terminal devices based on the strategy until it is determined that all the terminal devices satisfy the congestion control requirement.

At S32022, the terminal device is controlled to access the network based on the configured delay access time to transmit uplink data.

Those having ordinary skill in the art will understand that all or some of the steps of the methods, systems, and functional modules/units of the apparatus disclosed above may be implemented as software, firmware, hardware, and suitable combinations thereof. In hardware implementation, the division between the functional modules/units mentioned in the above description does not necessarily correspond to the division of physical components; for example, one physical component may have multiple functions, or one function or step may be performed cooperatively by multiple physical components. Some or all of the components may be implemented as software executed by a processor, such as a digital signal processor or microprocessor, or implemented as hardware, or implemented as an integrated circuit, such as an application specific integrated circuit. Such software may be distributed on a computer-readable medium, which may include a non-transitory computer-readable storage medium (or non-transitory medium) and a communication medium (or transitory medium). As well known to those having ordinary skill in the art, the term non-transitory computer-readable storage medium includes volatile and non-volatile, removable and non-removable medium implemented in any method or art for storing information (such as computer-readable instruction, data structure, programming module or other data). The non-transitory computer-readable storage medium includes, but is not limited to, a Random Access Memory (RAM), a Read-Only Memory (ROM), an (Electrically Erasable Programmable Read-Only Memory (EEPROM), a flash memory or other memory technologies, a Compact Disc Read-Only Memory (CD-ROM), a Digital Versatile Disc (DVD) or other optical disc storage, magnetic boxes, magnetic tapes, magnetic disk storage or other magnetic storage devices or any other medium that can be used to store desired information and can be accessed by computers. Moreover, it is well known to those of ordinary skills in the art that the communication medium typically includes computer-readable instructions, data structures, program modules, or other data in a modulated data signal, such as a carrier wave or other transmission mechanism, and may include any information delivery medium.

What is claimed is:

1. A congestion control method, comprising:
for a plurality of terminal devices transmitting caller data in a first predetermined duration starting from a first moment, configuring a corresponding delayed access time for each terminal device at a first time interval;

determining whether each terminal device satisfies a congestion control requirement; and based on a determination of whether the plurality of terminal devices satisfy the congestion control requirement, performing congestion control on the terminal device accessing a network;

wherein, the terminal device comprises a low priority terminal device, and the delayed access time is configured to control a time that the terminal device accesses a network in response to a subsequent event being reported;

wherein before determining whether each of the terminal devices satisfies a congestion control requirement, the method further comprises:

monitoring a terminal device accessing the network within a second predetermined duration from a second moment;

wherein, the second moment comprises: a moment when a first terminal device accessing the network based on the allocated delayed access time is monitored after the corresponding delayed access time is configured for each terminal device; the second predetermined duration being greater than the first predetermined duration.

2. The method of claim 1, wherein based on a determination of whether the plurality of terminal devices satisfy the congestion control requirement, performing congestion control on the terminal device accessing a network comprises:

in response to a determination that at least one terminal device in the plurality of terminal devices does not satisfy the congestion control requirement, reconfiguring a corresponding delayed access time for each terminal device in the at least one terminal device based on a strategy until all terminal devices satisfy the congestion control requirement; and in response to a determination that all the at least one terminal device satisfies the congestion control requirement, controlling the at least one terminal device to access the network based on the configured corresponding delayed access time;

wherein, a time interval for reconfiguring a corresponding delayed access time for each terminal device in the at least one terminal device is not equal to the first time interval.

3. The method of claim 2, wherein reconfiguring a corresponding delayed access time for each terminal device in the at least one terminal device based on a strategy comprises:

configuring a corresponding delayed access time for each terminal device in the at least one terminal device based on a second time interval;

after configuring the corresponding delayed access time for each terminal device in the at least one terminal device based on the second time interval, determining whether each terminal device in the at least one terminal device satisfies the congestion control requirement; and in response to a determination that at least one terminal device in the plurality of terminal devices does not satisfy the congestion control requirement, reconfiguring a corresponding delayed access time for the terminal device that does not satisfy the congestion control requirement based on a third time interval until all terminal devices satisfy the congestion control requirement;

wherein, a duration of the second time interval and a duration of the first time interval are not equal, and the third time interval is different from the first time interval and the second time interval.

4. The method of claim 2, wherein after configuring a corresponding delayed access time for each terminal device, the method further comprises:

recording the delayed access time allocated to each terminal device by taking a predetermined unique terminal device identifier as an index.

5. The method of claim 3, wherein after configuring a corresponding delayed access time for each terminal device, the method further comprises:

recording the delayed access time allocated to each terminal device by taking a predetermined unique terminal device identifier as an index.

6. The method of claim 2, further comprising:

counting a number of times that each terminal device does not satisfy the congestion control requirement; and in response to a determination that the number of times that each terminal device does not satisfy the congestion control requirement is greater than a predetermined number threshold, feeding back an abnormal status of each terminal device.

7. The method of claim 3, further comprising:

counting a number of times that each terminal device does not satisfy the congestion control requirement; and in response to a determination that the number of times that each terminal device does not satisfy the congestion control requirement is greater than a predetermined number threshold, feeding back an abnormal status of each terminal device.

8. The method of claim 1, wherein determining whether each terminal device satisfies a congestion control requirement comprises:

for each terminal device monitored, determining whether each terminal device accesses the network at the delayed access time configured; and in response to a determination that each terminal device accesses the network at the delayed access time configured, determining that the delayed access time configured for each terminal device satisfies the congestion control requirement; and in response to a determination that each terminal device does not access the network at the delayed access time configured, determining that the delayed access time configured for each terminal device does not satisfy the congestion control requirement.

9. The method of claim 1, wherein after configuring a corresponding delayed access time for each terminal device, the method further comprises:

recording the delayed access time allocated to each terminal device by taking a predetermined unique terminal device identifier as an index.

10. The method of claim 1, further comprising:

counting a number of times that each terminal device does not satisfy the congestion control requirement; and in response to a determination that the number of times that each terminal device does not satisfy the congestion control requirement is greater than a predetermined number threshold, feeding back an abnormal status of each terminal device.

11. A congestion control apparatus, comprising: an initial configuration unit, a determination unit, and an adjustment and control unit; wherein, the initial configuration unit is configured for: for a plurality of terminal devices transmitting caller data in a first predetermined duration starting from a first moment, configuring a corresponding delayed access time for each terminal device at a first time interval;

the determination unit is configured for: determining whether each terminal device satisfies a congestion control requirement; and the adjustment and control unit is configured for: based on a determination whether the plurality of terminal devices satisfy the congestion control requirement, performing congestion control on the terminal device accessing a network;

wherein, the terminal device comprises a low priority terminal device, and the delayed access time is configured to control a time that the terminal device accesses a network in response to a subsequent event being reported;

further comprising:

a monitoring unit, which is configured for: monitoring a terminal device accessing the network within a second predetermined duration from a second moment; wherein, the second moment comprises: a moment when a first terminal device accessing the network based on the allocated delayed access time is monitored after the corresponding delayed access time is configured for each terminal device; the second predetermined duration being greater than the first predetermined duration.

12. A non-transitory computer-readable storage medium storing instructions which, when executed by a processor, causes the processor to perform the congestion control method of claim 1.

13. A terminal device, comprising a memory, a processor and a program instruction stored in the memory and executable by the processor, wherein the program instruction, when executed by the processor, causes the processor to perform a congestion control method, the congestion control method comprising:

for a plurality of terminal devices transmitting caller data in a first predetermined duration starting from a first moment, configuring a corresponding delayed access time for each terminal device at a first time interval;

determining whether each terminal device satisfies a congestion control requirement; and based on a determination of whether the plurality of terminal devices satisfy the congestion control requirement, performing congestion control on the terminal device accessing a network;

wherein, the terminal device comprises a low priority terminal device, and the delayed access time is configured to control a time that the terminal device accesses a network in response to a subsequent event being reported;

wherein before determining whether each of the terminal devices satisfies a congestion control requirement, the method further comprises:

monitoring a terminal device accessing the network within a second predetermined duration from a second moment;

wherein, the second moment comprises: a moment when a first terminal device accessing the network based on the allocated delayed access time is monitored after the corresponding delayed access time is configured for each terminal device; the second predetermined duration being greater than the first predetermined duration.

* * * * *